United States Patent
Minamikawa (10) Patent No.: US 10,657,268 B2
(45) Date of Patent: May 19, 2020

(54) INFORMATION PROCESSING APPARATUS, INFORMATION PROCESSING METHOD, AND NON-TRANSITORY COMPUTER READABLE MEDIUM TO VERIFY VALIDITY OF BACKUP DATA

(71) Applicant: FUJI XEROX CO., LTD., Tokyo (JP)

(72) Inventor: Takahiro Minamikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 140 days.

(21) Appl. No.: 15/346,826

(22) Filed: Nov. 9, 2016

(65) Prior Publication Data

US 2017/0329976 A1 Nov. 16, 2017

(30) Foreign Application Priority Data

May 11, 2016 (JP) .................................. 2016-095575

(51) Int. Cl.
| | | |
|---|---|---|
| *G06F 21/60* | (2013.01) | |
| *H04L 9/08* | (2006.01) | |
| *G06F 21/64* | (2013.01) | |
| *G06F 21/44* | (2013.01) | |

(52) U.S. Cl.
CPC ............ *G06F 21/602* (2013.01); *G06F 21/44* (2013.01); *G06F 21/64* (2013.01); *H04L 9/0822* (2013.01); *H04L 9/0897* (2013.01)

(58) Field of Classification Search
CPC ........ G06F 21/602; G06F 21/64; G06F 21/44; G06F 21/57; H04L 9/0897; H04L 9/0822
See application file for complete search history.

(56) References Cited

U.S. PATENT DOCUMENTS

| | | | | |
|---|---|---|---|---|
| 5,309,251 A | * | 5/1994 | Terajima | G06Q 20/363 358/400 |
| 9,280,453 B1 | * | 3/2016 | Covarrubias | G06F 11/3684 |

(Continued)

FOREIGN PATENT DOCUMENTS

| | | |
|---|---|---|
| JP | 2008-236089 | 10/2008 |
| JP | 2008-236091 | 10/2008 |

(Continued)

OTHER PUBLICATIONS

Japanese Office Action dated Mar. 10, 2020 in corresponding Japanese patent application No. 2016-095575 and English translation.

(Continued)

*Primary Examiner* — Chau Le
*Assistant Examiner* — Han Yang
(74) *Attorney, Agent, or Firm* — Fildes & Outland, P.C.

(57) ABSTRACT

There is provided an information processing apparatus. An internal storage unit encrypts a data encryption key used for encryption of data to an encrypted data encryption key and stores the encrypted key. A first verification unit verifies validity of its own external storage unit on the basis of identification information acquired from the external storage unit that stores backup data regarding the EDEK and the identification information of the external storage unit. Another verification unit verifies validity of the backup data stored in the external storage unit.

5 Claims, 5 Drawing Sheets

(56) References Cited

U.S. PATENT DOCUMENTS

| | | | | |
|---|---|---|---|---|
| 2002/0053008 | A1* | 5/2002 | Goodman | G06F 11/1417 |
| | | | | 711/162 |
| 2005/0283662 | A1* | 12/2005 | Li | G06F 21/6209 |
| | | | | 714/13 |
| 2006/0107320 | A1* | 5/2006 | Bhatt | G06F 21/575 |
| | | | | 726/22 |
| 2008/0192940 | A1* | 8/2008 | Feng | H04L 9/0894 |
| | | | | 380/286 |
| 2008/0209553 | A1* | 8/2008 | Lu | G06F 12/1433 |
| | | | | 726/22 |
| 2008/0226080 | A1* | 9/2008 | Li | G06F 21/57 |
| | | | | 380/277 |
| 2008/0226081 | A1* | 9/2008 | Terao | G06F 21/62 |
| | | | | 380/277 |
| 2014/0101719 | A1* | 4/2014 | Lakshminarayanan | G06F 21/6245 |
| | | | | 726/3 |
| 2016/0065369 | A1 | 3/2016 | Kakutani | |

FOREIGN PATENT DOCUMENTS

| | | |
|---|---|---|
| JP | 2008-236092 | 10/2008 |
| JP | 2011-113594 | 6/2011 |
| JP | 2016-053753 | 4/2016 |

OTHER PUBLICATIONS

English language machine translation of JP 2011-113594.

* cited by examiner

INFORMATION PROCESSING APPARATUS, INFORMATION PROCESSING METHOD, AND NON-TRANSITORY COMPUTER READABLE MEDIUM TO VERIFY VALIDITY OF BACKUP DATA

CROSS-REFERENCE TO RELATED APPLICATIONS

This application is based on and claims priority under 35 U.S.C. § 119 from Japanese Patent Application No. 2016-095575 filed on May 11, 2016.

TECHNICAL FIELD

The present invention relates to an information processing apparatus and an information processing method.

SUMMARY

According to an aspect of the embodiments of the present invention, there is provided an information processing apparatus including an internal storage unit that encrypts a data encryption key used for encryption of data to an encrypted data encryption key (EDEK) and stores the encrypted key, a first verification unit that verifies validity of its own external storage unit on the basis of identification information acquired from the external storage unit that stores backup data regarding the EDEK and the identification information of the external storage unit, and another verification unit that verifies validity of the backup data stored in the external storage unit.

BRIEF DESCRIPTION OF THE DRAWINGS

Exemplary embodiments of the present invention will be described in detailed based on the following figures, wherein.

DETAILED DESCRIPTION

Hereinafter, an exemplary embodiment of the invention will be described with reference to the accompanying drawings. Meanwhile, in the drawings, components having substantially the same function will be denoted by the same reference numeral and sign, and a description thereof will not be repeated. Meanwhile, in the present exemplary embodiment, an image processing apparatus is described as an example of an information processing apparatus, but other information processing apparatuses may be used.

Figure 1:
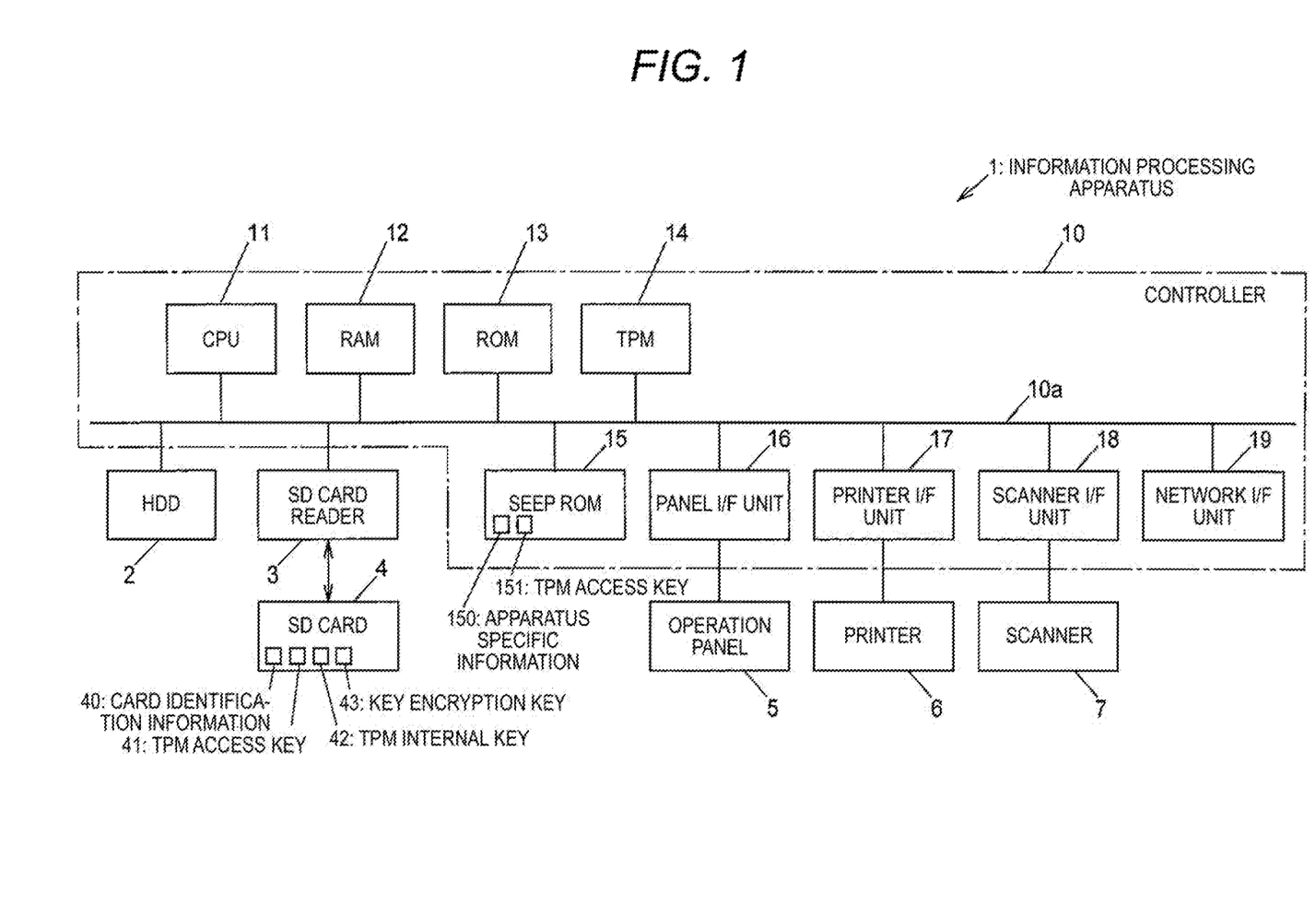
FIG. 1 is a block diagram showing an example of a hardware configuration of an information processing apparatus according to an exemplary embodiment of the invention.

FIG. 1 is a block diagram showing an example of a hardware configuration of an information processing apparatus according to an exemplary embodiment of the invention.

An information processing apparatus 1 includes a controller 10 that controls the overall information processing apparatus 1, and a hard disk drive (HDD) 2, an SD card reader 3, an operation panel 5, a printer 6, and a scanner 7 are connected to the controller 10 through a bus 10a.

The controller 10 includes a central processing unit (CPU) 11, a random access memory (RAM) 12, a read only memory (ROM) 13, a trusted platform module (TPM) 14, a serial electrically erasable programmable read only memory (SEEPROM) 15, a panel I/F unit 16, a printer I/F unit 17, a scanner I/F unit 18, and a network I/F unit 19. Components constituting the controller 10 are mounted on, for example, a controller board (a mother board may also be used). For this reason, when the component of the controller 10 has a defect, it is necessary to replace the controller board and all.

Data to be encrypted is encrypted and is stored in the HDD 2. Meanwhile, data to be encrypted is not limited to data which is stored in the HDD 2.

The SD card reader 3 writes and reads data in and from an SD card 4 which is inserted thereinto. The SD card 4 is a memory card capable of being inserted into and extracted from the SD card reader 3, and is an example of an external storage unit. The information processing apparatus 1 is configured to be inoperable in a state where the SD card 4 is extracted from the SD card reader 3. For this reason, the SD card 4 is fixed to the controller board, for example, using a jig, but there is a concern of the SD card 4 being invalidly replaced with another SD card 4.

Backup data including a TPM access key 41, a TPM internal key 42, and an encrypted data encryption key (EDEK) 43, which are described later, and card identification information for identifying the SD card 4 are stored in the SD card 4. The card identification information is an example of identification information of its own external storage unit. The FMK 43 is a key obtained by encrypting a data encryption key. The TPM access key 41, the TPM internal key 42, and the EDEK 43 are examples of backup data related to the EDEK stored in the TPM 14.

The operation panel 5, including a touch panel display in which a touch panel is superimposed on a display unit such as a liquid crystal display, displays an operation screen on the display unit and receives an operation with respect to the touch panel from an operator.

The printer 6, including an image holding body using, for example, a photoreceptor, forms an image on a recording medium, such as paper, and outputs the formed image. The printer 6 is an example of an image output unit.

The scanner 7 optically reads image data from a document. The scanner 7 is an example of an image input unit.

The operation panel 5 is connected to the panel I/F unit 16, the printer 6 is connected to the printer I/F unit 17, and the scanner 7 is connected to the scanner I/F unit 18. A user terminal, a server, and the like are connected to the network I/F 19 through a network.

The RAM 12 temporarily stores data. The ROM 13 stores a control program for controlling the information processing apparatus 1, card identification information, and the like.

The TPM 14 is a security chip conforming to specifications that are set by a trusted computing group (TCG), and has excellent tamper resistance. The tamper resistance of the TPM 14 is a property in which an EDEK stored therein cannot be read out because the EDEK is physically damaged when there is an attempt to analyze the inside thereof and to read the EDEK, The TPM 14 is an example of an internal storage unit which is mounted on the controller board.

Meanwhile, the internal storage unit may be any of other internal storage units such as a hardware security module (HSM).

The TPM 14 has at least the following functions.

(a) A function of requiring an authentication key (hereinafter, referred to as a "TPM access key") in using the function of the TPM 14. It is possible to generate a TPM access key from apparatus specific information 150 using the function.

(b) A function of hierarchically encrypting a data encryption key using data encryption to generate and store an EDEK (hereinafter, referred to as a "TPM internal key"). It is possible to restore the EDEK using the function and to return the TPM 14 to its original state.

(c) A self diagnosis function of checking the state of the TPM 14. The wording "state of the TPM 14" as used herein refers to any one of a state where the TPM is ready to be used (initialization state), a state where the TPM is not ready to be used (non-initialization state), and a state where the TPM is in an unusable state (TPM chip defect error state).

The SEEPROM 15 is an electrically rewritable non-volatile memory. The apparatus specific information (for example, a serial number, a MAC address, and the like) 150 of the information processing apparatus 1 is written in the SEEPROM 15 during shipment from the plant or during the replacement of the controller board. The SEEPROM 15 is protected so that a user cannot change stored contents after the apparatus specific information 150 is written therein. In addition, a TPM access key 151 generated from the apparatus specific information 150 is written in the SEEPROM 15 using the functions of the TPM 14 when the information processing apparatus 1 is first started up or when the information processing apparatus 1 is started up after the replacement of the controller board. Meanwhile, the SEEPROM 15 may be mounted in another place within the information processing apparatus 1 rather than being mounted on the controller board.

Figure 2:
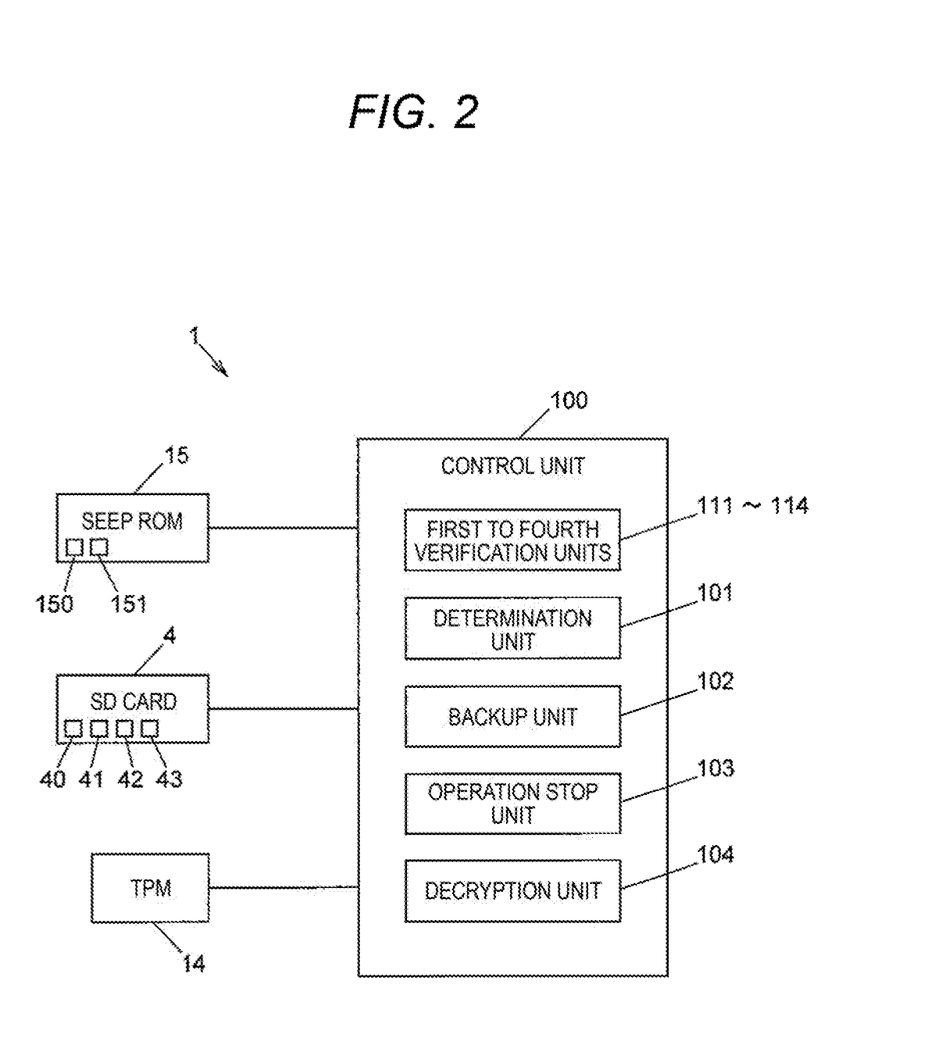
FIG. 2 is a block diagram showing functions of the information processing apparatus according to the present exemplary embodiment.

FIG. 2 is a block diagram showing functions of the information processing apparatus 1. As shown in FIG. 2, the CPU 11 operates in accordance with the control program stored in the ROM 13 to thereby function as first to fourth verification units 111 to 114, a determination unit 101, a backup unit 102, an operation stop unit 103, a decryption unit 104, and the like.

The determination unit 101 determines in which state of an initialization state, a non-initialization state, and a TPM chip defect error state the TPM 14 is set.

The backup unit 102 backs up the TPM access key 41, the TPM internal key 42, and the EDEK 43 which are generated by using the functions of the TPM 14 in the SD card 4.

The first verification unit 111 verifies the validity of the SD card 4 in accordance with whether card identification information acquired from the SD card 4 and card identification information stored in the ROM 13 conform to each other.

The second verification unit 112 acquires the TPM access key 41 included in backup data from the SD card 4 and compares the TPM access key 41 with a TPM access key generated from the apparatus specific information 150 to thereby verify the validity of the TPM access key 41 in accordance with whether or not both the keys conform to each other. The TPM access key 41 is an example of first data. The second verification unit 112 is an example of another verification unit.

When the determination unit 101 determines that the TPM 14 is in a non-initialization state, the third verification unit 113 acquires the TPM internal key 42 from the SD card 4 and verifies the validity of the TPM internal key 42 in accordance with whether or not the state of the TPM 14 can be restored from the TPM internal key 42 using the functions of the TPM 14. The TPM internal key 42 is an example of second data. The third verification unit 113 is an example of another verification unit.

When the determination unit 101 determines that the TPM 14 is in an initialization state, the fourth verification unit 114 acquires the EDEK 43 from the SD card 4 and verifies the validity of the EDEK 43 in accordance with whether or not a data encryption eye can be restored from the EDEK 43 using the functions of the TPM 14. The EDEK 43 is an example of third data. The fourth verification unit 114 is an example of another verification unit.

The operation stop unit 101 stops the subsequent operations of the information processing apparatus 1 when the first verification unit 111 determines that the SD card 4 is invalid, when the second verification unit 112 determines that the TPM access key 14 is invalid, when the third verification unit 113 determines that the TPM internal key 42 is invalid, and when the fourth verification unit 114 determines that the EDEK 43 is invalid.

The decryption unit 104 reads out the EDEK 43 from the SD card 4, and decrypts the read-out EDEK 43 using the functions of the TPM 14.

(Operation in Exemplary Embodiment)

Figure 3:
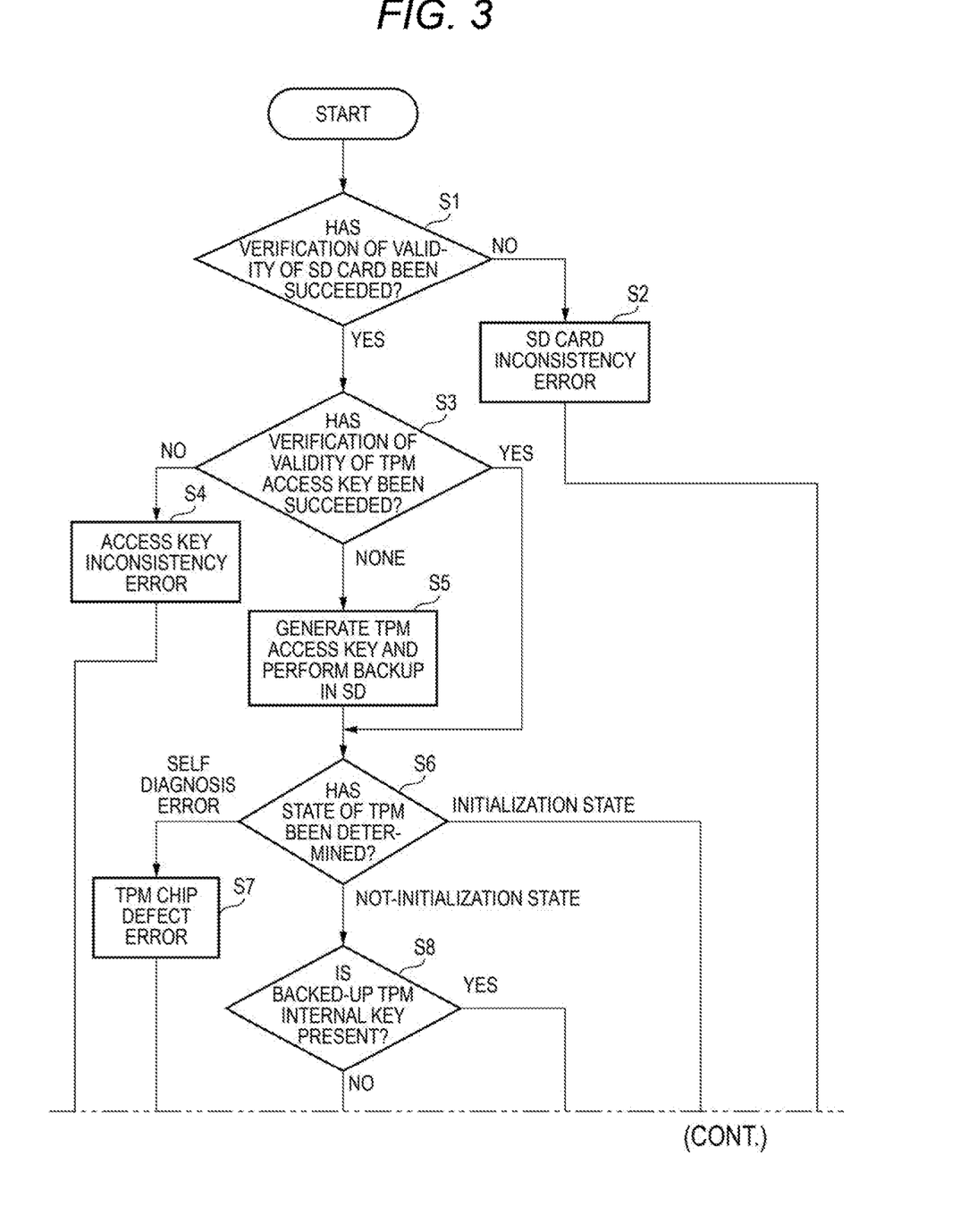
FIG. 3 is a flow chart showing an example of a verification process of the information processing apparatus according to the present exemplary embodiment.

Next, an example of the operation of the information processing apparatus 1 will be described. FIG. 3 is a flow chart showing an example of a verification process of the information processing apparatus 1.

(1) Verification of Validity of SD Card

When the information processing apparatus 1 is started up, the first verification unit 111 verifies the validity of the SD card 4 (S1). That is, the first verification unit 111 acquires card identification information 40 from the SD card 4, and determines whether or not the acquired card identification information 40 conforms to card identification information stored in the ROM 13.

In a case where the verification of validity succeeds by conformity between both the pieces of information (S1: Yes), the first verification unit 111 determines that the SD card 4 is valid. In a case where the verification of validity is failed due to unconformity between both the pieces of information (S1: No), the first verification unit 111 determines that the SD card 4 is invalid and displays "SD card inconsistency error" on the operation panel 5 (S2), and the operation stop unit 103 stops the subsequent operations of the information processing apparatus 1. In a case where the original SD card 4 of the information processing apparatus 1 is invalidly replaced with an SD card 4 of an information processing apparatus 1 different from the information processing apparatus 1, the determination of being invalid can be performed. In this case, in order to normally use the information processing apparatus 1 again, replacement with the original SD card 4 is required to be performed.

(2) Verification of Validity of TPM Access Key

When the verification of validity of the SD card 4 succeeds (S1: Yes), the second verification unit 112 verifies the validity of the TPM access key 41 which is backed up in the SD card 4 (S3). That is, the second verification unit 112 acquires the TPM access key 41 which is backed up in the SD card 4. Subsequently, the second verification unit 112 acquires the TPM access key 151 which is written in the SEEPROM 15. The second verification unit 112 determines whether the TPM access key 41 acquired from the SD card 4 and the TPM access key 151 acquired from the SEEPROM 15 conform to each other.

In a case where the verification of validity is failed due to unconformity between both the keys in step S3 (S3: No), the second verification unit 112 displays "access key inconsistency error" on the operation panel 5 (S4), and the operation stop unit 103 stops the subsequent operations of the information processing apparatus 1. In a case where the original SD card 4 of the information processing apparatus 1 is invalidly replaced with an SD card 4 of an information processing apparatus 1 different from the information processing apparatus 1, the determination of being invalid can be performed here. In this case, in order to normally use the information processing apparatus 1 again, replacement with the original SD card 4 is required to be performed.

In a case where the TPM access key 151 is not written in the SEEPROM 15 in step S3 (S3: None) the backup unit 102 generates the TPM access key 151 using the functions of the TPM 14 from the apparatus specific information 150 written in the SEEPROM 15, writes the TPM access key 151 in the SEEPROM 15, and backs up the TPM access key 41 as backup data in the SD card 4 (S5). In a case where the information processing apparatus 1 is first started up or in a case where the information processing apparatus 1 is started after the replacement of the controller board, the TPM access key 151 is written in the SEEPROM 15 because of the TPM access key 151 not being written in the SEEPROM 15, and the TPM access key 41 is backed up in the SD card 4.

In a case where the verification of validity is succeeded by conformity between both the keys in step S3 (S3: Yes), the process proceeds to the next process (S6).

(3) Determination of State of TPM

The determination unit 101 determines the state of the TPM 14 (S6). That is, the determination unit 101 determines the state of the TPM 14 using a self diagnosis function of the TPM 14.

In a case where a determination result in step S6 indicates a self diagnosis error (S6: self diagnosis error), the determination unit 101 displays "TPM chip defect error" on the operation panel 5 due to the TPM 14 being set to be in an unusable state for some reason (S7), and the operation stop unit 103 stops the subsequent operations of the information processing apparatus 1. In this case, in order to normally use the information processing apparatus 1 again, replacement with the controller board is required to be performed.

In a case where the information processing apparatus 1 is first started up and immediately after the controller board is replaced, a non-initialization state is set. In a case where a determination result in step S6 indicates a non-initialization state (S6: non-initialization state), the third verification unit 113 confirms the presence or absence of the backed-up TPM internal key 42 in the SD card 4 (S8).

Since a case where the TPM internal key 42 is not backed up in the SD card 4 (S8: No) is a case where the information processing apparatus 1 is first started up, the backup unit 102 generates the TPM internal key 42 using the functions of the TPM 14, and the TPM internal key 42 is backed up in the SD card 4 (S9).

A case where the TPM internal key 42 is backed up in the SD card 4 (S8: Yes) is a case where the information processing apparatus is started up after the replacement of the controller board, and thus the third verification unit 113 verifies the validity of the backed-up TPM internal key 42 (S10). When the controller hoard is replaced, the existing SD card 4 is used, and thus the TPM internal key 42 is backed up in the SD card 4.

That is, the third verification unit 113 determines whether or not the state of the TPM 14 can be restored by the TPM internal key 42 backed up in the SD card 4 using the functions of the TPM 14. When the stale can be, restored, the verification of validity is succeeded (S10: Yes), and the process proceeds to the next process (S12).

When the state cannot be restored, the verification of validity is failed (S10: No). Accordingly, third verification unit 113 displays "invalid error of internal key" on the operation panel 5 (S11), and the operation stop unit 103 stops the subsequent operations of the information processing apparatus 1. In this case, in order to normally use the information processing apparatus 1 again, replacement with the original SD card 4 is required to be performed.

In a case where a verification result in step S6 indicates an initialization state (S6: initialization state), the process proceeds to the next process (S12).

(4) Confirmation of Presence or Absence of Data Encryption Key

The fourth verification unit 114 confirms whether or not the EDEK 43 is present in the SD card 4 (S12). When the information processing apparatus 1 is first started up, the EDEK 43 is not backed up in the SD card 4 (S12; No), and thus the backup unit 102 newly generates an EDEK using a random bit generator or the like (S13). Further, the backup unit 102 encrypts a data encryption key using the functions of the TPM 14 (S14), and the EDEK 43 obtained by the encryption is backed up in the SD card 4 (S15).

In a case where the EDEK 43 is backed up in the SD card 4 (S12: Yes), the fourth verification unit 114 decrypts the EDEK 43 using the functions of the TPM 14 (S16). When the decryption is failed (S17: No), the tampering of backup data is suspected. Accordingly, "invalid error of backup data" is displayed on the operation panel 5 (S18), and the operation stop unit 103 stops the subsequent operations of the information processing apparatus 1. In this case, in order to normally use the information processing apparatus 1 again, replacement with the original SD card 4 is required to be performed. The decryption is succeeded (S17: Yes), the subsequent processes can be continuously performed.

(5) Decryption Process

Figure 4:
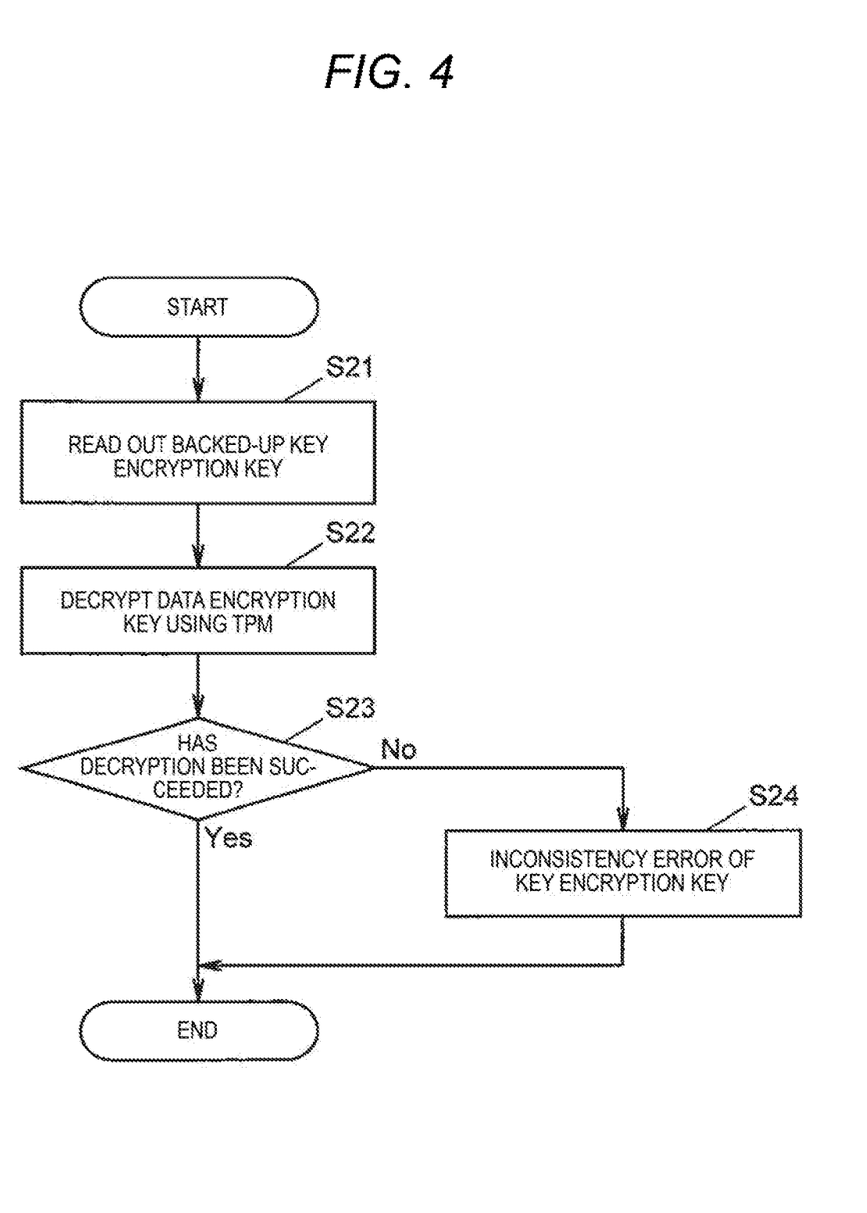
FIG. 4 is a flow chart showing an example of a decryption process of the information processing apparatus according to the present exemplary embodiment.

FIG. 4 is a flow chart showing an example of a decryption process of the information processing apparatus 1. The validity of EDEK 43 can be verified during the start-up of the information processing apparatus, but consistency of a key is required to be additionally confirmed by encryption and decryption. In a case where replacement with an HDD of another apparatus is performed in this order, a decryption process is failed due to inconsistency of a key.

The decryption unit 104 reads out the EDEK 43 from the SD card 4 (S21), and decrypts the read-out EDEK 43 using the functions of the TPM 14 (S22). When the decryption is succeeded (S23: Yes), data of the HDD 2 is decrypted using a data encryption key obtained by the decryption, and the subsequent processes can be continuously performed. When the decryption is failed (S23: No), the decryption unit 104 displays "inconsistency error of EDEK" on the operation panel 5, and the operation stop unit 103 stops the subsequent operations of the information processing apparatus 1.

Other Exemplary Embodiments

Meanwhile, the exemplary embodiment of the invention is not limited to the above-described exemplary embodiment, and can be modified in various ways without departing from the scope of the invention. For example, in the above-described exemplary embodiment, a TPM access key is backed up in the SD card 4, but may not be backed up. In addition, steps can be added, deleted, changed, and replaced in the flow of the exemplary embodiment without departing from the scope of the invention. In addition, a program used in the above-described exemplary embodiment can also be provided by being recorded in a computer-readable recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a trusted platform module (TPM) that is an internal storage unit that encrypts a data encryption key used for encryption of data to an encrypted data encryption key (EDEK) and stores the encrypted key;
   a serial electrically erasable programmable read only memory (SEEPROM) that stores apparatus specific information used by the TPM to generate a TPM access key, the generated TPM access key being stored in the SEEPROM;
   a ROM memory configured to store a program; and
   a processor that is configured to execute, in response to being loaded with the program from the ROM memory:
   a determination unit configured to determine a state of the TPM;
   a first verification unit configured to verify validity of its own external storage unit, which is a SD card that stores backup data regarding the EDEK, on the basis of (a) identification information acquired from the SD card and (b) identification information of the SD card permanently stored in the ROM memory, by determining whether the identification information acquired from the SD card conforms to the identification information stored in the ROM memory, wherein in a case in which the identification information acquired from the SD card does not conform to the identification information stored in the ROM memory, subsequent operations of the information processing apparatus are stopped; and
   another verification unit configured to verify validity of the backup data stored in the SD card, in a case in which the first verification unit verifies that the identification information acquired from the SD card conforms to the identification information stored in the ROM memory, the backup data including a backup TPM access key, a backup TPM internal key, and a backup EDEK, wherein:
      the another verification unit includes a second verification unit configured to acquire the backup TPM access key included in the backup data from the SD card and configured to compare the backup TPM access key with the TPM access key stored in the SEEPROM, to thereby verify validity of the backup TPM access key when the first verification unit is capable of verifying validity of the SD card, and subsequent operations of the information processing apparatus are stopped when the second verification unit determines that the backup TPM access key is invalid;
      the another verification unit includes a third verification unit configured to acquire the backup TPM internal key included in the backup data from the SD card to thereby verify validity of the backup TPM internal key in accordance with whether or not the state of the TPM is capable of being restored from the backup TPM internal key by using functions of the TPM, when the determination unit determines that the TPM is in a non-initialization state, and subsequent operations of the information processing apparatus are stopped when the third verification unit determines that the backup TPM internal key is invalid; and
      the another verification unit includes a fourth verification unit configured to acquire the backup EDEK included in the backup data from the SD card to thereby verify validity of the backup EDEK in accordance with whether or not the data encryption key is capable of being restored from the backup EDEK by using functions of the TPM, when the determination unit determines that the TPM is in an initialization state, and subsequent operations of the information processing apparatus are stopped when the fourth verification unit determines that the backup EDEK is invalid.

2. The information processing apparatus according to claim 1, further comprising a backup unit configured to be executed by the processor and generate data necessary for verification to thereby back up the generated data in the SD card, when the another verification unit determines that the necessary data is not backed up in the SD card.

3. The information processing apparatus according to claim 1, further comprising an operation stop unit configured to be executed by the processor and stop subsequent operations of the apparatus when the verification of the another verification unit is failed.

4. An information processing method of an information processing device including a trusted platform module (TPM) that is an internal storage unit, a serial electrically erasable programmable read only memory (SEEPROM) that stores apparatus specific information used by the TPM to generate a TPM access key, the generated TPM access key being stored in the SEEPROM, a ROM memory configured to store a program, and a processor that is configured to execute the information processing method in response to being loaded with the program from the ROM memory, the information processing method comprising:
   encrypting a data encryption key used for encryption of data to an encrypted data encryption key (EDEK) and storing the encrypted key in the TPM;
   determining a state of the TPM;
   verifying, by a first verification unit configured to be executed by the processor, when the information processing device is started up, validity of its own external storage unit, which is a SD card that stores backup data regarding the EDEK, on the basis of (a) identification information acquired from the SD card and (b) identification information of the SD card permanently stored in the ROM memory, by determining whether the identification information acquired from the SD card conforms to the identification information stored in the ROM memory, wherein in a case in which the identification information acquired from the SD card does not conform to the identification information stored in the ROM memory, subsequent operations of the information processing device are stopped; and verifying, by another verification unit configured to be executed by the processor, validity of the backup data stored in the SD card, in a case in which the first verification unit verifies that the identification information acquired from the SD card conforms to the identification information stored in the ROM memory, the backup data including a backup TPM access key, a backup TPM internal key, and a backup EDEK;

acquiring, by a second verification unit included in the another verification unit and configured to be executed by the processor, the backup TPM access key included in the backup data from the SD card and comparing the backup TPM access key with the TPM access key stored in the SEEPROM, to thereby verify validity of the backup TPM access key when the first verification unit is capable of verifying validity of the SD card, and stopping subsequent operations of the information processing apparatus when the second verification unit determines that the backup TPM access key is invalid;

acquiring, by a third verification unit included in the another verification unit and configured to be executed by the processor, the backup TPM internal key included in the backup data from the SD card to thereby verify validity of the backup TPM internal key in accordance with whether or not the state of the TPM is capable of being restored from the backup TPM internal key by using functions of the TPM, when it is determined that the TPM is in a non-initialization state, and stopping subsequent operations of the information processing apparatus when the third verification unit determines that the backup TPM internal key is invalid; and acquiring, by a fourth verification unit included in the another verification unit and configured to be executed by the processor, the backup EDEK included in the backup data from the SD card to thereby verify validity of the backup EDEK in accordance with whether or not the data encryption key is capable of being restored from the backup EDEK by using functions of the TPM, when it is determined that the TPM is in an initialization state, and stopping subsequent operations of the information processing apparatus when the fourth verification unit determines that the backup EDEK is invalid.

5. A non-transitory computer readable medium storing a program causing a computer to execute an information processing method, the computer including a trusted platform module (TPM) that is an internal storage unit, a serial electrically erasable programmable read only memory (SEEPROM) that stores apparatus specific information used by the TPM to generate a TPM access key, the generated TPM access key being stored in the SEEPROM, and a ROM memory, the information processing method comprising:

encrypting a data encryption key used for encryption of data to an encrypted data encryption key (EDEK) and storing the encrypted key in the TPM;

determining a state of the TPM;

verifying, by a first verification unit configured to be executed by the program, when the computer is started up, validity of its own external storage unit, which is a SD card that stores backup data regarding the EDEK, on the basis of (a) identification information acquired from the SD card and (b) identification information of the SD card permanently stored in the ROM memory, by determining whether the identification information acquired from the SD card conforms to the identification information stored in the ROM memory, wherein in a case in which the identification information acquired from the SD card does not conform to the identification information stored in the ROM memory, subsequent operations of the computer are stopped; and verifying, by another verification unit configured to be executed by the program, validity of the backup data stored in the SD card, in a case in which the first verification unit verifies that the identification information acquired from the SD card conforms to the identification information stored in the ROM memory, the backup data including a backup TPM access key, a backup TPM internal key, and a backup EDEK;

acquiring, by a second verification unit included in the another verification unit and configured to be executed by the program, the backup TPM access key included in the backup data from the SD card and comparing the backup TPM access key with the TPM access key stored in the SEEPROM, to thereby verify validity of the backup TPM access key when the first verification unit is capable of verifying validity of the SD card, and stopping subsequent operations of the information processing apparatus when the second verification unit determines that the backup TPM access key is invalid;

acquiring, by a third verification unit included in the another verification unit and configured to be executed by the program, the backup TPM internal key included in the backup data from the SD card to thereby verify validity of the backup TPM internal key in accordance with whether or not the state of the TPM is capable of being restored from the backup TPM internal key by using functions of the TPM, when it is determined that the TPM is in a non-initialization state, and stopping subsequent operations of the information processing apparatus when the third verification unit determines that the backup TPM internal key is invalid; and acquiring, by a fourth verification unit included in the another verification unit and configured to be executed by the program, the backup EDEK included in the backup data from the SD card to thereby verify validity of the backup EDEK in accordance with whether or not the data encryption key is capable of being restored from the backup EDEK by using functions of the TPM, when it is determined that the TPM is in an initialization state, and stopping subsequent operations of the information processing apparatus when the fourth verification unit determines that the backup EDEK is invalid.

* * * * *